United States Patent [19]

Weinkle

[11] Patent Number: 4,815,859
[45] Date of Patent: Mar. 28, 1989

[54] ROLLER FOR MAKING PIZZA SHELL

[76] Inventor: Steven Weinkle, 55 Pinta Rd., Miami, Fla. 33133

[21] Appl. No.: 155,909

[22] Filed: Feb. 16, 1988

[51] Int. Cl.⁴ .............................................. B29B 1/06
[52] U.S. Cl. ..................................... 366/69; 29/110.5; 29/121.1
[58] Field of Search ....................... 366/69, 71, 72, 73, 366/348, 349, 342, 343; 29/110.5, 121.1, 121.2, 121.5, 121.6, 125; 99/450.1; 426/443

[56] References Cited

U.S. PATENT DOCUMENTS

| 240,015 | 4/1881 | Ewell | 29/110.5 |
| 819,772 | 5/1906 | Latham | 366/69 |
| 1,692,827 | 11/1928 | Gehrlein | 15/262 |
| 1,915,128 | 6/1933 | Keltie | 29/121.1 |
| 2,094,083 | 9/1937 | Rey | 426/443 |
| 4,418,769 | 1/1988 | Conkey | 366/69 |

Primary Examiner—Robert W. Jenkins
Attorney, Agent, or Firm—John C. Malloy

[57] ABSTRACT

A roller for forming a pizza shell, comprising a cylindrical member jacketed by a sleeve having rows of knobs of generally semi-spherical form on the outer surface and with the knobs being spaced closely adjacent one another and the knobs of each row being staggered with respect to the knobs of adjacent rows, for use in simulating hand kneading, hand stretching and hand shaping of a dough ball into a pizza shell.

4 Claims, 1 Drawing Sheet

ROLLER FOR MAKING PIZZA SHELL

FIELD OF THE INVENTION

This invention relates to a roller for simulating hand kneading, stretching and shaping of a dough ball into a pizza shell.

In the past, there have been many types of rollers and other devices for use in working dough. A representative prior art patent is that of U.S. Pat. No. 240,015 which is for a dough kneeder which is of rigid material, such as wood, glass or other molded forms of material which is equivalent. Another prior art patent is that of Latham, U.S. Pat. No. 819,772, which is of a roller with projecting radial spikes for airating dough which is being rolled. It is also known to use pairs of rollers, such as the wringer of a washing machine, as shown in U.S. Pat. No. 1,692,827, or in the printing industry such as shown in U.S. Pat. No. 1,915,128, and also in the preparation of rubber, as in U.S. Pat. No. 827,936. There have also been kneeding machines, such as that of U.S. Pat. No. 2,094,083, for use in preparing dried fruit. This invention is of a roller which is structured and configured as set forth more fully hereinafter for the purpose of simulating hand kneading, hand stretching and hand shaping of a dough ball into a pizza shell, a very common and highly desired food.

OBJECTS OF THE INVENTION

It is an object of this invention to provide a roller which is specifically configured and structured so that, in use, it simulates hand kneading, hand stretching and hand shaping of a dough ball into a pizza shell.

DETAILED DESCRIPTION OF THE PREFERRED EMBODIMENT

Figure 1:
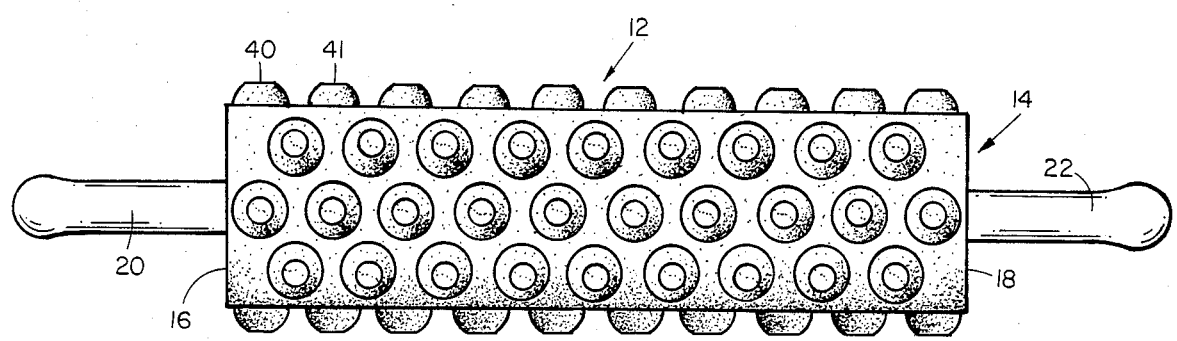
FIG. 1 is an elevation view of the roller of the instant invention.
Figure 2:
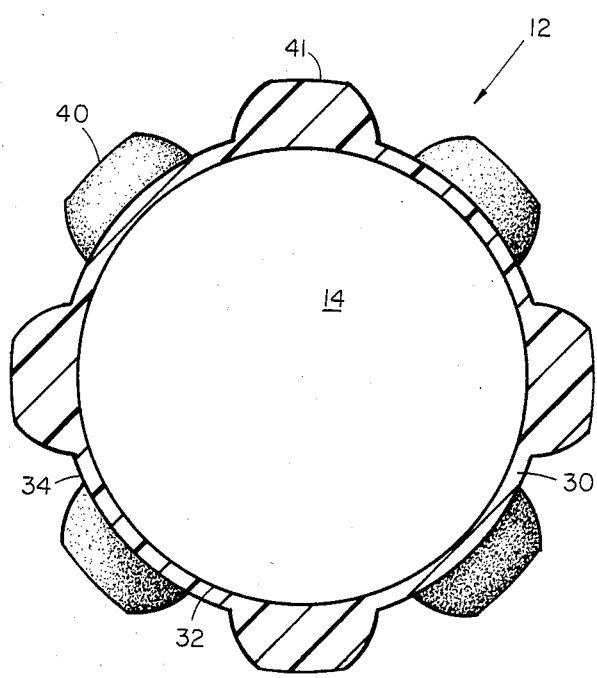
FIG. 2 is a transverse sectional view of the embodiment of FIG. 1.

Referring to the drawings, wherein like reference characters designate like or corresponding parts throughout the several views and referring particularly to FIG. 1, there is shown a roller generally designated by the numeral 12. It is configured, structured and adapted to simulate, when in use, hand kneading, hand stretching and hand shaping of a dough ball into a pizza shell. It is composed of a cylindrical member generally designated by the numeral 14 which has a first end 16 and a second end 18. Preferably, it is provided with axially extending portions 20 and 22 which may be in the form of roller handles. In the preferred embodiment, the cylindrical member 14 is of a diameter of about 3 inches. However, the cylindrical member 14 is not limited to this transverse dimension. It is made of a hard, rigid material, so that the outer surface is rigid. An outer sleeve 30 is provided to jacket the cylindrical member 14. The sleeve 30 snugly jackets the outer surface of the cylindrical member 14 and has an inner surface which confronts the cylindrical member as at 32 and also has an outer surface 34. The outer surface 34 is provided with a plurality of circumferentially spaced, adjacent, axially extending rows of fingertip-stimulating knobs, such as those designated by the numerals 41 and 42. Each of the knobs 41 and 42 of each row is of a truncated generally spherical shape extending a height of preferably but not necessarily about ⅜ to ¾ inches and less than the radius of curvature of the knob. The center of each of the knobs of each row is about 1¼ inches apart and each knob has a generally rounded base of about 1⅛ inches in diameter. The knobs of each row are spaced uniformly apart and, additionally, the distal end of each knob is generally flattened so that, in use and under pressure, it simulates a yieldable fingertip action in response to radial and tangential pressures created by rolling of the roller over a surface. Additionally, the sleeve 30 and, more particularly, the knobs 40 and 42, are of a durameter of between 20 and 80, and the sleeve is of rubbery material. In a preferred embodiment, the knobs may be of closely adjacent air-filled pockets or be composed entirely of rigid material. In any event, it is important that the knobs be generally yieldable resembling the yieldability of the flesh on the tips of a person's fingers. As shown, the knobs of each row are staggered with respect to the knobs of each adjacent row so that in response to pressure applied in the range of 25 to 200 pounds vertically on a dough ball and with the roller being rolled over a rigid surface, the dough is adapted to be shaped, kneeded and stretched to convert the dough ball upon manipulation of the roller into a pizza shell. Preferably, the dough is composed of flour, water, oil, sugar, salt and yeast, as is conventional in the pizza shell manufacturing industry.

While the instant invention has been shown and described in what is considered to be a practical and preferred embodiment, it is recognized that departures may be made within the spirit and scope of this invention which is therefore not to be limited except as set forth in the claims which follow:

What is claimed is:

1. A roller to simulate hand kneeding, hand stretching and hand shaping of a dough ball into a pizza shell comprising:

a cylindrical member having a first end and a second end and being of a substantially uniform diameter along its length, said member having a hard rigid outer surface;

a sleeve snugly jacketing the outer surface of said cylindrical member, said sleeve having an inner surface and an outer surface;

said sleeve being of rubbery material of a duramater of between 20 and 80;

said outer surface of said sleeve having a plurality of circumferentially spaced, adjacent, axially extending rows of fingertip-simulating knobs, and said inner surface confronting said cylindrical member;

each of the knobs of each row being of a truncated generally spherical shape extending substantially transversely outward from said outer surface of said sleeve and having a generally rounded base, said knobs of each row being uniformly spaced;

a distal surface of each knob being generally flat to simulate yieldable fingertip action in response to radial and tangential pressure created by rolling of the roller over a surface;

the knob of each row being staggered with respect to the knobs of each adjacent row, so that in response to pressure on dough on a rigid surface whereby, when the dough is composed of a mixture of flour, water, oil, sugar, salt and yeast, it is adapted to be kneeded, stretched, shaped and sized in response to rolling by said roller when under a vertical pressure varying between 20 and 200 pounds.

2. The roller as set forth in claim 1 wherein axially extending projections are disposed in outwardly extending co-axial relation to opposite ends of the cylindrical roller.

3. The roller as set forth in claim 1 wherein said knobs extend outwardly to a height of about ⅜ to ¾ inches with the center of each knob on each row being about 1¼ inches apart, said cylinder being of a substantially uniform diameter along its length of about 3 inches or greater.

4. The roller as set forth in claim 3 wherein each of said knobs has a base of about 1⅛ inches in diameter.

* * * * *